(12) United States Patent
Dallum et al.

(10) Patent No.: US 8,430,801 B2
(45) Date of Patent: Apr. 30, 2013

(54) LIGHTWEIGHT CONVEYOR ROLLER

(75) Inventors: John Dallum, Ramsey, MN (US); Bryan Spiess, St. Francis, MN (US)

(73) Assignee: Advanced Aircraft Roller Systems, Inc., Ramsey, MN (US)

( * ) Notice: Subject to any disclaimer, the term of this patent is extended or adjusted under 35 U.S.C. 154(b) by 556 days.

(21) Appl. No.: 12/386,776

(22) Filed: Apr. 22, 2009

(65) Prior Publication Data

US 2009/0272620 A1  Nov. 5, 2009

Related U.S. Application Data

(60) Provisional application No. 61/125,043, filed on Apr. 22, 2008.

(51) Int. Cl.
*F16C 13/00* (2006.01)
*B65G 13/00* (2006.01)

(52) U.S. Cl.
USPC .............. 492/59; 492/56; 492/16; 193/37; 198/780

(58) Field of Classification Search ............. 492/57, 492/59, 56, 13, 14, 16, 19, 45, 47; 193/843, 193/780, 37; 29/895.2, 895.211, 895.22, 29/895.23
See application file for complete search history.

(56) References Cited

U.S. PATENT DOCUMENTS

| | | |
|---|---|---|
| 736,027 A | 8/1903 | Sauer |
| 1,305,330 A | 6/1919 | Wolever et al. |
| 2,258,268 A | 10/1941 | Sparks et al. |
| 2,572,276 A | 10/1951 | Moe |
| 2,672,306 A | 3/1954 | Doolittle et al. |
| 2,886,156 A | 5/1959 | Halbron |
| 3,293,728 A | 12/1966 | Hill |

(Continued)

FOREIGN PATENT DOCUMENTS

| | | |
|---|---|---|
| BE | 671.076 | 11/1965 |
| DE | 295 05 461.1 | 7/1995 |

(Continued)

OTHER PUBLICATIONS

"Compressive Strength Testing of Plastics" [online], Dec. 1, 2007, MATWEB.COM.

*Primary Examiner* — Sarang Afzali
(74) *Attorney, Agent, or Firm* — Merchant & Gould P.C.

(57) ABSTRACT

A roller made lighter through the use of lightening elements. The inventive roller, with its lightening element(s), is lighter yet maintains its overall dimensions, is strong and durable enough to withstand the rigors of the transportation industry and/or is cost effective to produce and maintain. The lightweight roller may be part of a system having at least one operable roller unit, each roller unit having a roller, cylindrical in shape having a length and a diameter, and a center aperture extending through the length of the roller, an axel/shaft having a diameter sized to rotatably fit within the central aperture of the roller, the shaft further having a retention mechanism located upon the shaft ends and an elongate "U" shaped roller rack, the roller rack sized to extend the length of the roller and having a pair of upwardly extending arms located adjacent the ends of the roller, each arm end having an aperture sized to receive the respective shaft end and locate the shaft with the roller in a fixed location. The roller system has at least one roller, preferably more or all of the rollers, having internal and/or external lightening elements.

12 Claims, 6 Drawing Sheets

U.S. PATENT DOCUMENTS

| | | |
|---|---|---|
| 3,711,912 A | 1/1973 | Teske et al. |
| 3,797,082 A | 3/1974 | Brunes |
| 3,913,729 A | 10/1975 | Andrews |
| 4,168,771 A | 9/1979 | Krivec |
| 4,203,509 A * | 5/1980 | Thompson et al. ............. 193/37 |
| 4,213,523 A | 7/1980 | Frost et al. |
| 4,440,295 A | 4/1984 | Blackwood-Murray et al. |
| 4,681,203 A | 7/1987 | Kornylak |
| 4,766,996 A | 8/1988 | Gibson |
| 4,790,421 A | 12/1988 | Gorges |
| 4,838,986 A | 6/1989 | Rhoades et al. |
| 5,217,099 A | 6/1993 | Marcus et al. |
| 5,542,900 A * | 8/1996 | Burke ............................ 492/16 |
| 5,655,642 A | 8/1997 | Lawrence et al. |
| 5,806,131 A | 9/1998 | Tennant |
| 5,893,821 A | 4/1999 | Ando et al. |
| 6,044,963 A | 4/2000 | Lerch et al. |
| 6,113,059 A | 9/2000 | Couillard |
| 6,354,424 B1 * | 3/2002 | Rowles ....................... 193/35 A |
| 6,516,933 B1 | 2/2003 | Ledingham |
| 7,771,333 B2 | 8/2010 | Spiess et al. |

FOREIGN PATENT DOCUMENTS

| | | |
|---|---|---|
| EP | 0683438 A2 | 11/1995 |
| EP | 0683438 A3 | 11/1995 |
| GB | 2124333 A | 2/1984 |
| JP | 2000136287 A | 5/2000 |
| JP | 2007176620 | 7/2007 |

* cited by examiner

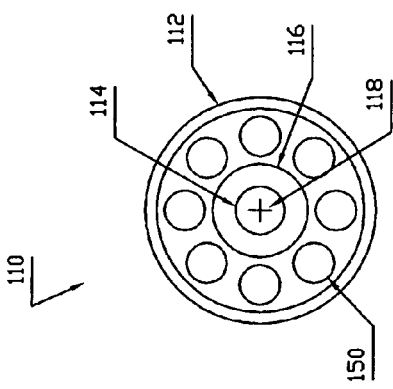
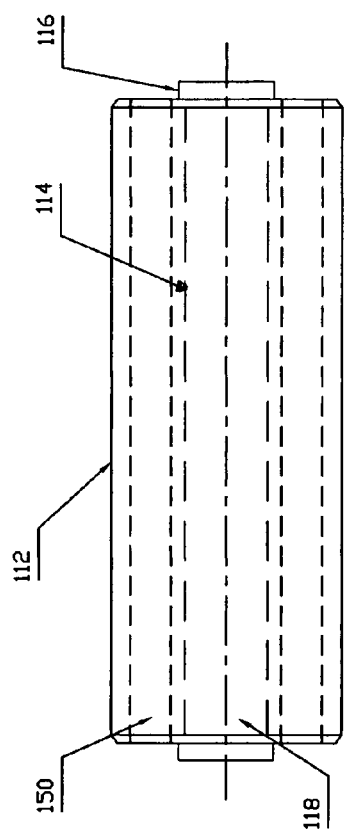
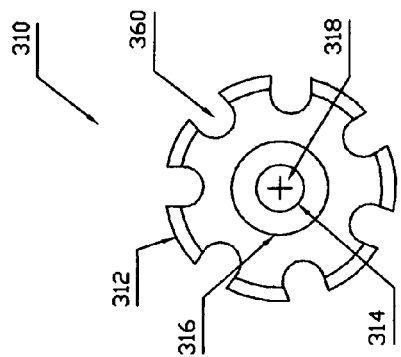
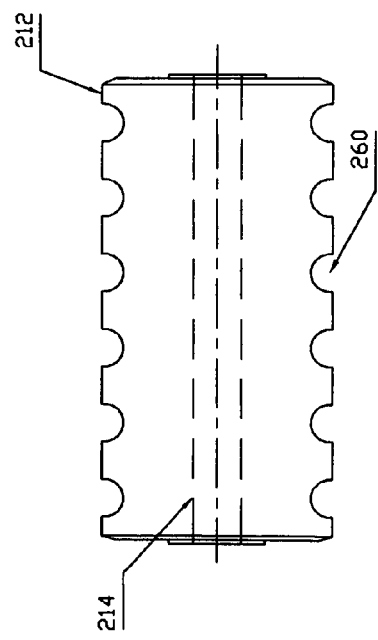

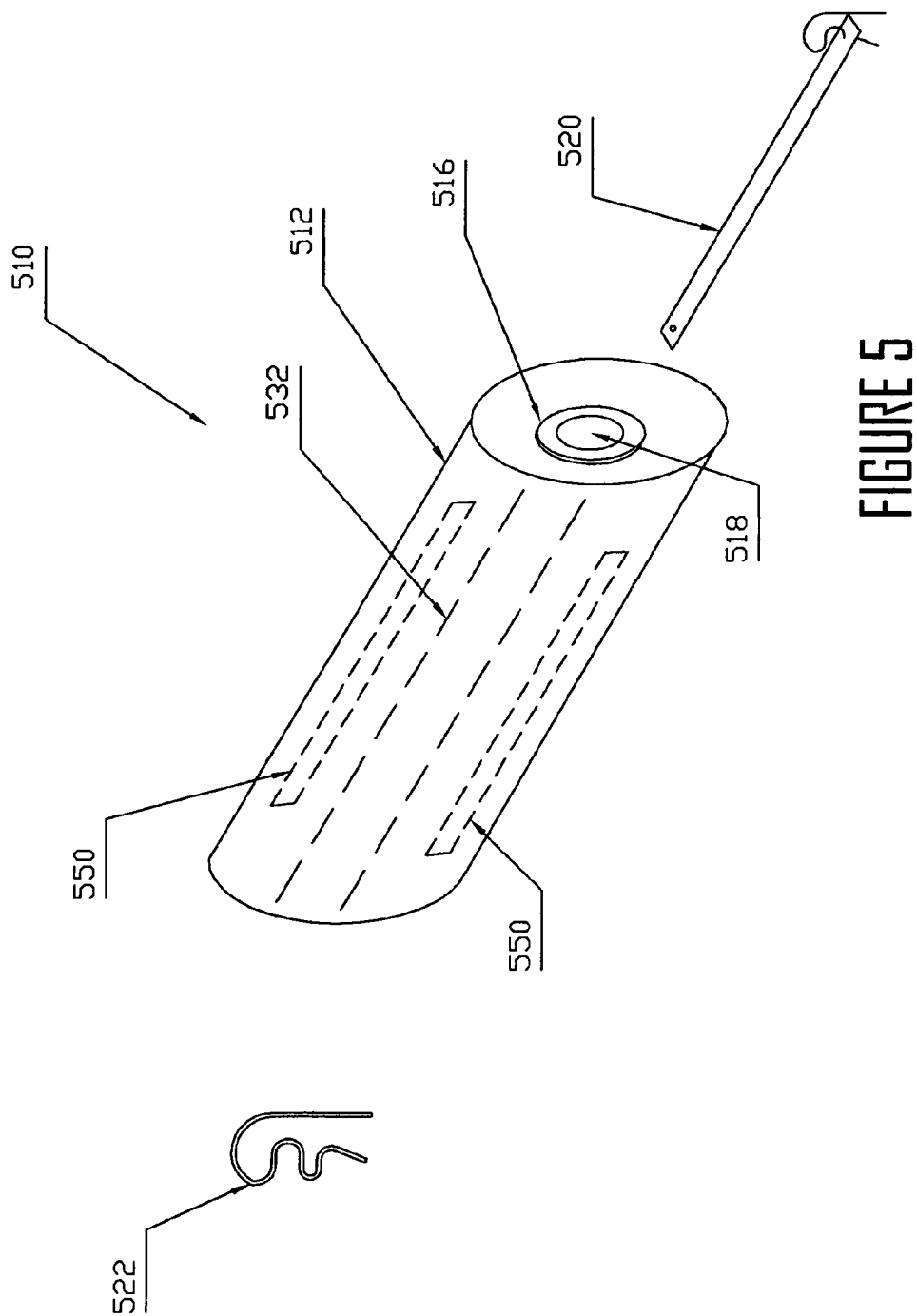

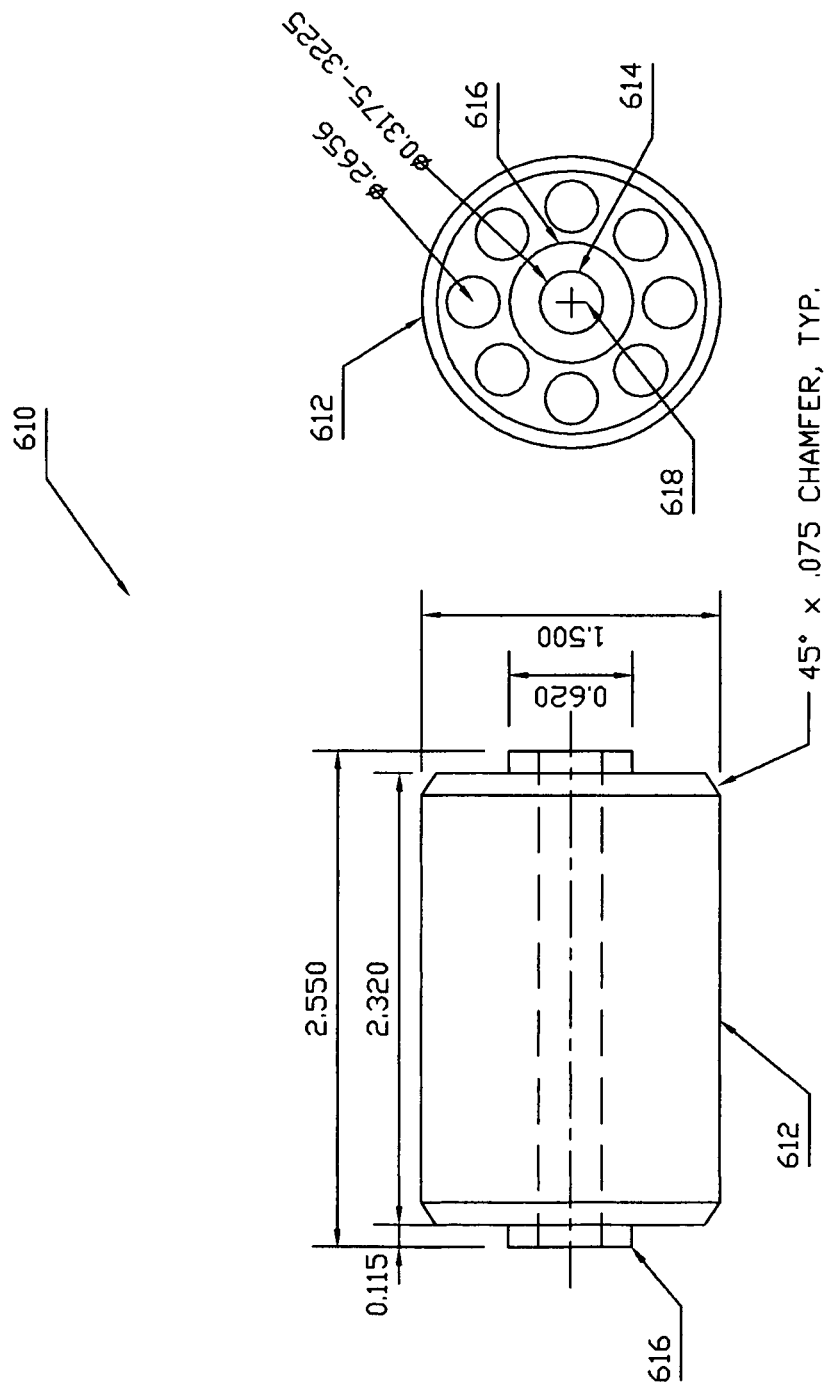

LIGHTWEIGHT CONVEYOR ROLLER

The present invention relates to lightweight rollers for conveyors. In one aspect, the rollers have a high strength to weight ratio. In another aspect, these rollers can be easy to manufacture, easy to use, economical to produce, and/or highly cost effective.

Conveyors are used in various systems, including manufacturing plants, loading and unloading areas such as shipping and receiving docks, and cargo haulers, such as aircrafts, boats, trains and trucks. While some conveyors may have an extending belt which provides the carrying surface, many do not. Conveyors for large or packaged goods often do not have large belts and merely rely on a series of rollers to carry the product along a production line.

One of the biggest factors in transporting goods by cargo haulers is the cost of fuel. Recently, the price for a barrel of oil has fetched well over $100 a barrel. These fuel costs can cut deeply into profits. It would, therefore, be desirable to reduce fuel consumption, thereby, increasing profits. One way to achieve this is to reduce the weight of the transporting vehicle. A lighter transporting vehicle will consume less fuel. Alternatively, a lighter transporting vehicle can carry more cargo for the same amount of fuel consumed.

In the case of transporting vehicles that carry their conveyor systems onboard, one way to lighten the vehicles is to decrease the weight of the rollers on the conveyor system. For example, in the airline industry, the placement of the roller can be in the cargo bay of an aircraft to allow the loading, unloading, and placement of cargo packages within the aircraft. The rollers in the cargo bay perform the dual function of allowing the cargo containers to be rolled into place and supporting the cargo during flight. An exemplary aircraft may have anywhere between 100 to 3000 rollers. It has been posited by some in the field that a roller reduced by as little as about 0.018 ounces can make a beneficial impact on fuel consumption over the length of its air travel life.

Reducing the weight of rollers may be one crucial way to save on fuel costs; however, the rollers must still be able to perform their intended function. While this goes without saying in all areas of roller use, maintaining the integrity of the roller and still reducing weight is especially difficult in the area of transportation by aircraft. Air travel requires special consideration such as being able to withstand rapid fluctuations in temperature and pressure many times during a flight. The effect of G force, or gravitational force, on the loads that the rollers may bear must be taken into consideration as the aircraft can go through rapid changes in altitude during flight. Also, air travel presents unique safety issues requiring maximum burn rates and comparison tests to FAA approved rollers. Because of these factors and/or requirements, only rollers approved by the FAA (Federal Aviation Agency) can be used on aircrafts.

The prior art seeks to make a conventional roller lightweight by constructing the roller as a hollow roller. While using hollow rollers may help with the weight problem, it creates the additional problem that the rollers may more easily become dented or otherwise deformed when a user is rough in loading the cargo. Moreover, hollow rollers allow foreign material, such as dust and dirt to enter the hollow space. Not only can this interfere with the smooth rolling of the bearings, it can also increase the weight of the rollers. Metallic rollers, such as those made of aluminum and/or steel, through normal use and exposure to the elements, can start to corrode and flake. These flakes can fall into the bearings and cause them to fail, which can lead to further corrosion as bits of metal grind against metal. Further, when the material of the roller, that portion from the outer surface in contact with the load and the inner surface in contact with the aperture, of the roller becomes thinner, it can weaken the roller to the extent that it may require weight bearing flanges or supports in order for it to function properly. What is needed is a strong but lightweight, durable roller.

Not only must rollers in the transportation industry be able to bear large weights, they must also be able to withstand rigorous handling. When a product moves along the conveyor system, all too frequently, the product will get stuck, requiring operator intervention to return the conveyer system to its operation of moving product. Frequently an operator can manually move the product into line and return the conveyer to operation; however, that is not always the case and sometimes an operator will resort to tools to move the product so that the conveyer can operate. When large containers of products are on the conveyer and not moving, frequently an operator will use a pry bar to urge the product into the proper location to move the product. Unfortunately, when pry bars are used, the bar is commonly placed between the rollers to lever the product along, the results are frequently denting of the roller housing or otherwise damaging the roller. This problem is exacerbated by the lack of internal support, especially if the roller was further hollowed to decrease its weight, and non-resilient materials were used as in the construction of prior rollers.

Rollers become damaged internally and externally over the course of their usable life. Prior rollers were manufactured of metal and provided no mechanism for viewing the internal components of the roller to determine if the wear had become too extensive for proper operation. Inspection of these rollers would entail disassembly of the rollers, inspection of the interior and reassembly if appropriate. The time and expense involved in this process have led most users to simply discard rollers after a period of time regardless of the condition of the roller. While the periodic replacement of rollers obviates the inspection costs and repair problems, it is costly to replace functioning rollers.

Moreover, manufacture of prior rollers involved assembling various parts including bearing, a housing, end caps and other components. Manufacture of a variety of components and later assemblage of the same is costly in terms of time and money. The complexity of the process has led to poorly constructed rollers.

Again, what is needed is a strong, lightweight roller. The roller may include a mechanism for viewing the structure of the roller for defects and need for repair. Further, the roller should provide support to the housing and the housing should be formed of a resilient material for long life with minimal wear. Additional desired features include corrosion resistance, ease of manufacture and/or ease of cleaning.

SUMMARY OF THE INVENTION

The present invention is a lightweight roller for a conveyor system with substantial new, useful and non-obvious features, which are needed in the marketplace. Similar to a conventional roller, the roller of the present invention is a cylindrical having a central aperture for mounting on a conventional axle. In one aspect, the roller is a generally integral single piece component formed of suitable polymer. However, unlike conventional rollers, the novel rollers contain lightening elements on the surface and/or within the roller. Through experimentation, the inventors have found that adding these lightening elements reduce weight, but still allow the rollers to possess the attributes necessary to perform their intended function, conveying cargo/products in a demanding field. In preferred embodiments, the lightening elements reduce the weight of the rollers, but they do not change the overall dimensions of the rollers. In preferred embodiments, the lightening elements may reduce the weight of each roller by at least 0.018 ounces. In preferred embodiments, the lightening elements may reduce the weight of each roller by up to ½ of the original weight of a roller.

In certain embodiments, the lightening elements may be in the form of cavities located within the material of the roller. These can also be referred to as internal lightening elements. In other embodiments, the lightening elements may be cavities located on the surface of the roller. These can also be referred to as external lightening elements. The lightening elements may be of various shapes, examples include, but are not limited to, tubular, ovular, circular, semi-circular, divets, and grooves such as straight, curved or zig-zag. In some embodiments, the lightening elements may run lengthwise along the roller, circumferentially, or their may be both elements in a lightened roller. Other applicable shapes will be apparent to those of skill in the art. In still other embodiments, the lightening elements may be located within the material of the roller and on the surface of the roller. Further, the lightening elements located within the material may be located wholly within the material creating hollow pockets of various shapes and/or they may extend out to the end portions of the rollers.

In the event that the lightening element is located and/or extended through to the end portion of the roller, the lightening element may be covered or plugged to prevent debris from entering the cavity. A covering may be a film of material such as rubber, paper or plastic or plugs of the same to close the lightening elements. One embodiment may include coverings in the form of labels affixed to the ends of the rollers to provide the cover for the cavity of the lightening elements. The cover would accommodate the aperture and the shoulders of the roller, if present. Other means will be apparent to those of skill in the art. In some embodiments, the lightening elements may be filled with a material that weighs less than the material that was removed. In preferred embodiments, the lightening elements are unfilled.

The rollers may be constructed as a monolithic unit from a polymeric material. The rollers may be molded from a polymeric material. In some preferred embodiments, the polymer is translucent or transparent to allow visual inspection of the entire roller without disassembly of the conveyor system. In certain embodiments, the rollers may consist essentially of polymeric materials.

The inventive roller may be a lightweight polymeric roller that can be formed from a single piece of a polymer that replaces a conventional metallic roller. In its simplest form, the roller is a lightweight polymeric roller that can be used to replace a conventional roller by simply removing the axle (also referred to as a shaft) that supports the conventional roller, removing the conventional roller and replacing the conventional roller with the new lightweight polymeric roller of the proper size and replacing the axle to retain the new roller.

It is an advantage of the invention to provide a lightweight monolithic roller for use in a conveyor or aircraft.

It is another advantage of the invention is to provide a dent resistant roller for use in a conveyor or aircraft.

It is a further advantage of the invention to provide a simple self lubricating roller that does not require bearings or lubricants for use in a conveyor or aircraft.

The invention may be a lightweight, one piece roller, that includes a mechanism for viewing the structure of the roller for defects and need for repair. Further, the roller provides support to the housing and the housing is formed of a resilient material for long life with minimal wear. Additional desired features may include corrosion resistance and/or ease of cleaning.

The lightweight rollers of the invention may be coupled to a conveyor system. The lightweight rollers of the invention may be directly or indirectly coupled to a transporting vehicle. In particular, the lightweight rollers of the invention may be directly or indirectly couple to an aircraft.

BRIEF DESCRIPTION OF THE DRAWINGS

FIGS. 1a and 1b depict two views, a side and an end view, respectively, of one embodiment of the invention.

FIG. 2 depicts another embodiment of the invention

FIG. 3 depicts an end view of another embodiment of the invention.

FIG. 5 depicts another embodiment of the invention.

FIGS. 6a and 6b depict a more detailed view of another embodiment of the invention.

DETAILED DESCRIPTION

Figure 4B:
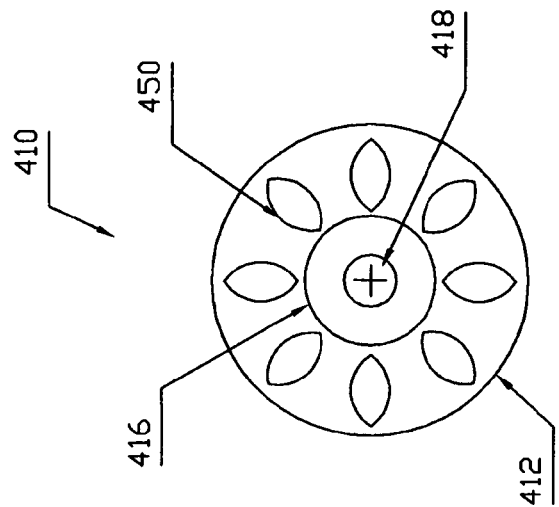
FIGS. 4a and 4b depict two views, a side and an end view, respectively, of another embodiment of the invention.

It has been discovered that the rollers of the present invention can be made lighter through the use of internal and/or external lightening elements, such as cavities and/or cutouts, while having the compressibility, impact strength and flexural strength described in the instant application. These lightweight rollers can handle heavy loads, corrosive environments and abusive treatment such as those found in the air transportation field.

The internal portion (or housing) of the roller is that portion between the outer surface of the roller and the inner surface of the roller which forms the aperture. An internal lightening element resides within these two surfaces. FIG. 1a depicts one example of a roller 110 of the invention. It shows a roller 110 with an outer surface 112, an inner surface 114, shoulders 116, and an aperture 118, with internal lightening elements 150 in the shape of cylinders (tubular). FIG. 1b shows an end view of the roller 110. One method of creating these internal lightening elements 150 would be to bore through the roller along its length similar to the aperture 118. These internal lightening elements 150 may or may not run the entire length of the roller. It is contemplated that the internal lightening elements may extend only partially into the internal portion of the roller so that weight can be reduced, but leaving the central portions of the roller undisturbed. A covering, such as a label, can be affixed to the ends of the roller to cover the exposed lightening elements so no debris can settle therein.

The roller 110 may also be molded to have lightening holes 150. After the initial cost to create a mold of the roller 110 (which is more expensive than machining from bar stock), it is relatively cheap and fast to produce. Moreover, molding allows for additional variations to the shape of the lightening elements. For example, as shown in FIG. 5, tubular lightening elements 550 may be created so as not to extend to the ends of the rollers 510, but rest wholly inside the material/housing of the roller, that portion between the outer surface 512 and the inner surface 514 of the roller 510. This would eliminate the need for a cover for the lightening elements. Methods of using molds to create products are well known in the art to the skilled artisan and incorporated herein.

FIG. 2 depicts another exemplary roller 210. This time the lightening elements 260 are on the outer surface 212 of the roller 210. They are in the shape of grooves running circumferentially around the roller 210. These external lightening elements 260, or cutouts, may also be configured to help the products they convey stay on their path by reducing the tendency to slip around. FIG. 3 depicts the end view of yet another exemplary roller 310. The lightening elements 360 are in the shape of grooves running longitudinally along the outer surface 312 of the roller 310. These external lightening elements 360 may be cutout, such as by lathing, or they may be molded. Also shown are the shoulder 316, inner surface 314 and aperture 318.

Figure 4A:
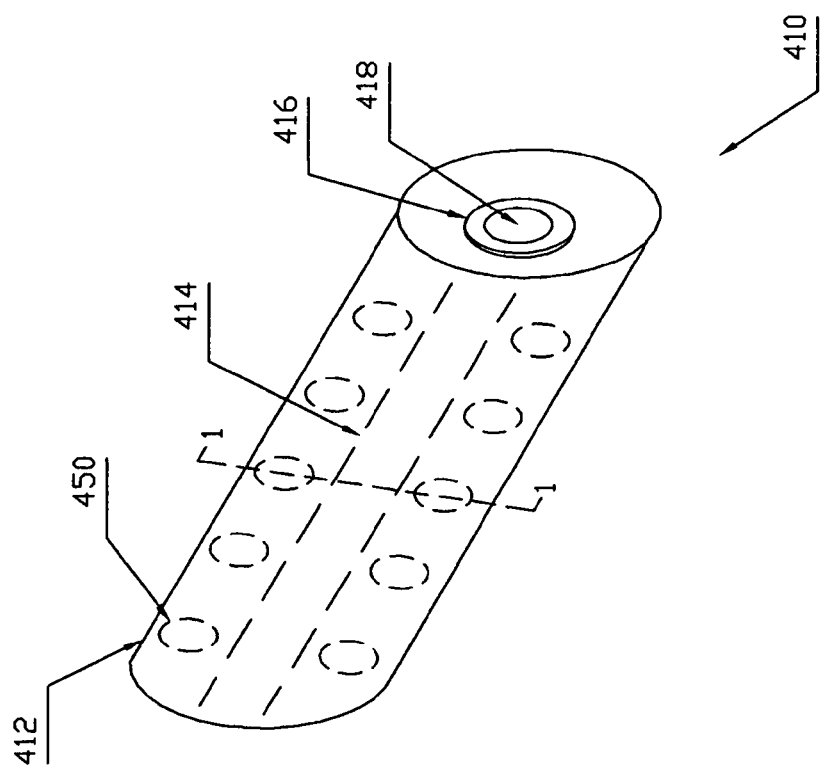

Rollers of the invention may include both internal and external lightening elements. They may have at least two lightening elements. Alternatively, the roller may have at least 3, 4, 5, 6, 7, 8, 9, 10, 11, 12 or more lightening elements. In one embodiment, such as FIGS. 1b, 3, and 6 the roller may have two or more lightening elements spaced evenly about the aperture. While lightening elements in the shape of tubes or grooves are easy and quick to create, lightening elements of the invention are not limited to these nor are they limited to being continuous. They may be divided into smaller non-continuous segments with the material of the roller found therebetween, such as divets or dimples. Another exemplary roller 410 is depicted in FIGS. 4a and 4b (showing the cross sectional view along 1-1) with elliptical lightening elements 450 found throughout the length of the roller 410. FIGS. 4a and b show the shoulder 416 and aperture 418. It is also contemplated, as discussed before, that these elliptical lightening elements 450, or other shaped lightening elements, are in the housing (between the outer surface 412 and inner surface 414) and may run continuously along the entire length of the roller, similar to those of FIGS. 1a and 1b, they may run almost the entire length of the roller but not to the ends of the roller, or they may be located towards the ends of the rollers leaving the central portion of the roller undisturbed.

It has been found that even a 0.018 ounces alleviation in weight can give a roller an advantage, especially in a cargo hold where there may be thousands of rollers. It is, therefore, contemplated that the lightening elements reduce the weight of the rollers by about 0.018 oz. In some embodiments, lightening elements can reduce a roller's weight (in ounces) by at least 0.035, 0.053, 0.071, 0.088, 0.106, 0.123, 0.141, 0.159, 0.176, 0.212, 0.247, 0.282, 0.317, 0.353, 0.423, 0.494, 0.564, 0.635, 0.705, 0.882, 1.058, 1.235, 1.411, 1.587, 1.764, 2.646, 3.527, 4.409, 5.291, 6.173, 7.055, 8.818, 10.582, 12.346, 14.11, 17.637, 19.401, 21.164, 22.928, 24.692, 26.455, 28.219, 29.983, 31.747, 33.51 or more. In some embodiments, the roller of the invention may reduce the weight of a roller, in pounds, up to 2.2, 2.8, 3.3, 3.9, 4.4 or more. In some embodiments, lightening elements may reduce the weight of a roller, in percentages, by at least 4, 6, 8, 10, 12, 14, 16, 18, 20, 22, 24, 26, 28, 30, 32, 34, 36, 38, 40 or more of its original weight. In some embodiments, lightening elements may reduce the weight of a roller, in percentages, by up to 42, 44, 46, 48, 50, 52, 54, or more. Generally speaking, one factor in the amount of weight that can be reduced while still retaining the desirable characteristics of the roller is dependent upon the length and diameter of the roller. Increasing the diameter relative to the length allows for a larger reduction in weight through the use of bigger and/or increased number of lightening elements. Unlike prior attempts to reduce the weight of rollers by hollowing them, thereby increasing the aperture, lightening elements do not increase the diameter of the aperture of a roller.

Referring to FIG. 5, an exemplary roller 510 is shown having an outer surface 512, an inner surface 514, bushing 532, and an aperture 518. Exemplary tubular internal lightening elements 550 are spaced evenly about the aperture 518. The bushing 532, typically found in rollers, may be integral with the housing, that material from the outer surface 512 to inner surface 514 of the roller 510 and may be integral with the shoulder 516. The bushing 532 is shown to extend the entire length of the roller 510. Co-axially extending through the bushing 532 is a centrally disposed aperture 518 sized to rotatably receive an axle 520 therethrough. The roller 510 can then be secured to a roller rack by pins 522 through the axel (or shaft) 520, thereby either directly or indirectly, joining the rollers 510 to a conveyor assembly. In other embodiments, the shoulder 516 may be a separate piece. If the shoulder 516 is a separate piece (may also be called an end cap), it is preferable that it be made of polymers having suitable physical characteristics for the environment in which the rollers are to operate. Of the voluminous polymers available, suitable polymers include polysulfone, polyetherimide, polyetherketone, polyphenylene sulfide and polyvinylidene fluoride. Other polymers may also work.

The actual size of a roller is dictated by its application. During manufacture, a roller will be constructed to be of a specific length and diameter to fit a particular application. In general, a roller may be approximately between ½ inch to 25 feet in length. Preferred rollers may be, in inches, at least 0.5, 0.75, 1, 1.25, 1.5, 1.75, 2.0, 2.25, 2.5, 2.75, 3.0, 3.25, 3.5, 3.75, 4.0, 4.25, 4.5, 5, 5.5, 6.0 or more. Preferred rollers may also be up to, in inches 6.25, 6.5, 7, 7.5, 8, 8.5, 9, 9.5, 10, 11, 12, 13, 14, 15, 16, 18, 20, 22, 24, 26, 28, 30 or more. In some embodiments, a roller may be between about 0.75 inch to 10 inches, about 1 inch to 8 inches, about 1.5 to 6 inches or about 2.5 inches to 4.5 inches in length. A roller's diameter may be about 0.25 inch to 12 inches. Preferably, its diameter may be about 0.33 inch to 10 inches, about 0.5 inch to 8 inches, about 0.5 inch to 6 inches about 1 inch to 4 inches. As an example only, a roller for an aircraft conveyor may be about 3¼ inches in length and about 1 inch in diameter. An example of the reduction in weight that is possible with lightening elements is that a roller up to 6 inches long and with a diameter of about 3 to 4.5 inch can reduce its weight by up to a ⅓ of its original weight and still be functional for its intended purpose.

FIGS. 6a and b depict an exemplary roller 610 of the invention with dimensions. The length of the roller 610 from shoulder 616 to shoulder 616 is about 2.55 inches. The length of the outer surface 612 is about 2.32 inches measured from one end of the roller 610 to the other. The chamfer 636 is at a 45 degree angle and is about 0.075 inches in length. The diameter of the shoulder 616 is about 0.62 inch and the diameter of the roller 610 is about 1.5 inches. The lightening elements 650 are about 0.2656 inch in diameter and the aperture 618 is about 0.3175-0.3225 inch in diameter. These measurements are provided for illustrative purposes only and do not limit the scope of the invention disclosed herein.

Figure 7:
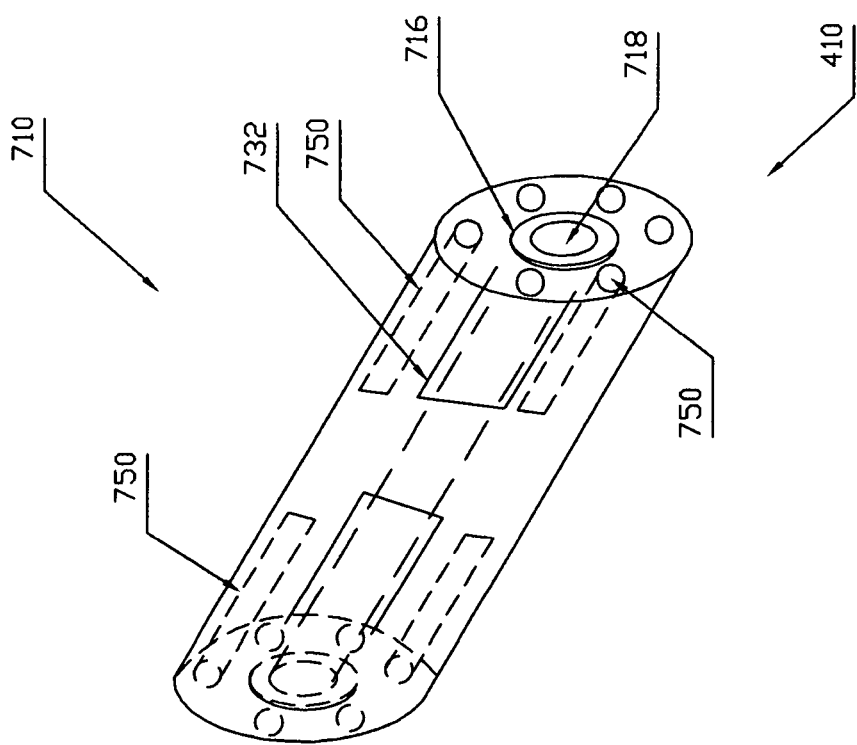
FIG. 7 depicts another embodiment of the invention.

In another embodiment of the invention depicted in FIG. 7, the bushing 732 may not extend the entire length of the roller 710, but extends only partially into the central aperture 718 and provides the bearing surface proximate the ends of the roller 710 to receive the axle 720 (not shown). Internal lightening elements 750 extend only partially into the material at both ends of the roller 710, leaving the center portion intact. A shoulder 716 is formed on each end of the roller 710. The shoulder 716 can provide a small space between the outer periphery of the roller (the ends) and the arms of the roller rack to minimize the possibilities of materials catching therebetween and fouling the roller 710. In this embodiment, it has been found that sufficient bearing area is provided and the removal of the central part of the bearing does not adversely affect the longevity of the roller 710.

Figure 8:
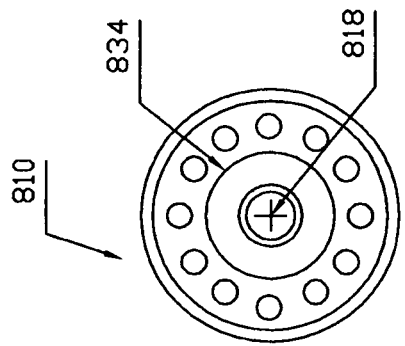
FIG. 8 depicts an end view of another embodiment of the invention.

In still another embodiment depicted in FIG. 8, the end of the roller 810 may be bored to accept a bearing 834. The bearing 834 may be any of the numerous types of readily available bearings, such as a ball bearing, roller bearing, needle bearing, or the like. Bearings 834 of this type are well known in the art and readily available from numerous sources. Although it is not required, the bearing 834 may be a sealed bearing. The bearing 834 is set into the end of the roller 810 leaving the bearing extending slightly out from the end of the roller 810 so that the bearing may perform the same function as the shoulder 716 of the roller 710 shown in FIG. 7.

The material making up the housing of the roller should have a compressibility strength sufficient to allow the roller and aperture to remain generally round as cargo passes over the conveyor. Should the roller or aperture become overly distorted the rollers will not rotate and will impede the movement of product or cargo along the conveyor. It has been found that a compressibility strength of 20 psi or greater is suitable for aircraft conveyor systems. Desirably, a roller of the invention may have a compressibility strength of at least 20, 50, 100, 200, 500, 1000, 2000 psi or greater when the roller is used in aircraft conveyors. The compressibility strength causes the roller to either lose or retain shape as weight bears on the roller.

Loosely related to the compressibility strength is brittleness. Rollers commonly receive sudden shock loads or other jarring force, such as from dropped loads or shifting loads or weights from sudden acceleration and deceleration. In these situations, it is important that the roller does not chip or otherwise deform. It has been reported that an impact strength needs to remain at or above 0.5 (foot lbs.)/inch. Desirably, the impact strength will be 1.0 ft. lbs./inch or greater. It has been found that workers using conveyors use pry bars and other similarly shaped tools prying against the rollers to dislodge stuck product. This makes impact strength important to guard against sudden shock loads that may occur in such instances.

The material of the roller should further be sufficiently resilient to return to its original shape after the cargo passes over the roller. Typically, the rollers are used millions of times over the life span of the roller. Rollers commonly wear by becoming misshaped over the life of the product. It has been reported that rollers should have a flexural strength of 20 psi or greater. Rollers of the invention my have a flexural strength of at least 20, 50, 100, 200, 500, 1000, 2000 psi or greater. A higher flexural strength adds life to the roller by providing a lower tendency to deform and a higher tendency to return to its original shape.

A method of testing the functionality of these rollers is by conducting a distributed load test for compressibility strength. Various laboratories are available to test the rollers. In essence, the roller to be tested is placed in a fixture that supports the roller by the pin shaft on either side. The fixture/roller assembly is placed beneath the crosshead of a calibrated universal testing machine, such as the Tinius Olson universal testing machine, MM210-002, such that a solid hexagonal rod would apply force along the length of the roller. The hexagonal rod may have a diameter of 1.07 inches and each face may measure 0.6 inch wide. The rod contacts the roller along its entire length. Force is applied to the roller through the hexagonal rod at a rate of 0.5 inch per minute. A load versus deflection chart is plotted during each test. The point at which the load deviates from the initial straight-line portion of the curve is noted as the yield load. Testing continues until the roller has clearly yielded.

The ultimate strengths of rollers in terms of compressibility, impact strength and flexural strength are dependent upon their intended use. The strengths set forth above are generally applicable to the transportation industry, in particular to their use in aircrafts.

The rollers of the invention may be constructed of known materials. Preferably, the materials are polymeric. Polymeric materials are particularly amendable to accommodating lightening elements. It has been found that various readily available polymers are suitable for fabrication into rollers. Suitable preferred polymers include polysulfone, nylon, polycarbonate, polyetherimide, polyetherketone, polyphenylene sulfide and polyvinylidene fluoride and acetal copolymers. Acetal copolymers are readily available under the trademarks of Celcon®, Acetron®, and other trademarks from various vendors.

Particularly relevant to the airline industry, rollers must be able to pass a burn test to be FAA approved. Acetal copolymer, an exemplary polymer, has been subjected to a burn test and has passed. The burn test is set forth in the FAA guidelines. The burn test requires that a roller have a burn rate of less than 4.0 inches per minute. The test samples have shown a burn rate of 0.6 inches per minute.

While the acetal copolymer rollers do not have the tested strength of some prior art metal rollers, the strength is sufficient for the intended uses. Moreover, acetal copolymer rollers, as well as other polymers, lend themselves well to accommodating lightening elements. Notable too was that, when tested against prior metal rollers that were hollowed to reduce weight, acetal copolymer rollers of similar weight did not dent or deform. Further, during compression experimentation, when an acetal copolymer roller did fail, the failure was obvious to see, allowing for easy detection and replacement. This ability would allow for quick detection of damaged rollers when these rollers are put to use in conveyor systems.

When the bushing is integral to the housing as shown in FIG. 5, lubricity is helpful to allow turning of the roller 510 on the axle 520. In such cases, a polymeric roller is desirable as lubricity may be controlled by the selection of an appropriate polymer. Should the polymer not have natural lubricity, lubricity may be added via a lubricant compatible with the chosen polymer. Also, polymeric bushings are more resistant to spalling bushing particles into the environment. Examples of suitable bushing materials include various polymers such as Nylon®, Delrin®, and acetal copolymers; or various alloys of brass and bronze, including Oilite®.

Polymeric rollers also allow for considerations of lubricity to be given to the outer surface 512 of the roller 510, as the choice of polymers can help prevent product or cargo atop the conveyor from moving too quickly or slowly. Polymeric rollers also tend to last longer than metal rollers. In some industries, cargo is moved along rollers on a large metal tray. With metal rollers, the metal to metal contact eventually causes wear leading to flaking of metal particles into the surrounding areas. This debris can find its way into the bearings of rollers reducing their efficiency or causing them to fail, and eventually making its way into the aperture of the roller. Not only can this build up of debris affect the ability of the rollers to rotate properly, it can also increase the weight of the rollers. Polymeric rollers are resistant to this type of damage, increasing the useful life of the roller.

Manufacturing one of the exemplary rollers such as FIGS. 1*a* and *b*, 4, and 6 may be made simple by machining an elongate piece of round stock to a suitable diameter, boring the stock to create a central aperture and lightening elements, cutting to length and detailing the ends to suit. A label may be affixed to the ends of the roller designed to cover the exposed lightening elements while leaving uncovered the central aperture to receive the axel. Surprisingly, it is efficient to machine rollers from readily available round stock. The machining may be automated on any of a number of CNC machines such as the Hardinge SUPERSLANT™ and others.

Other means of manufacturing rollers include molding or injection molding. A moldmaker (toolmaker) constructs a mold of the roller with the desired dimensions and features including the lightening elements. A mold usually consists of the longitudinally half of a roller. The material of the roller, preferably a polymer, is melted and injected into the molds. Once set, two halves of a roller and bound together to make a complete roller. The inventive rollers are not dependent on the manner of manufacture. Variations on methods of manufacturing rollers of the invention will be apparent to those of ordinary skill in the relevant art.

Lightening elements may be left empty, or they may be filled with a lightweight filler. One such filler may be a lighter aerated version of a polymer used for the roller. Another possible filling might be a lightweight polymer different from the one used to make the roller. Yet another possibility is the use of foamed polymers, including open or closed cell foams. The lightening element may be closed or covered with a film, cap or plug. In other embodiments, the lightening element may not be closed. In still other embodiments, the lightening element may be found wholly inside the material at the ends of the roller. In other words, the lightening element does not extend to the ends of the roller.

Figure 9:
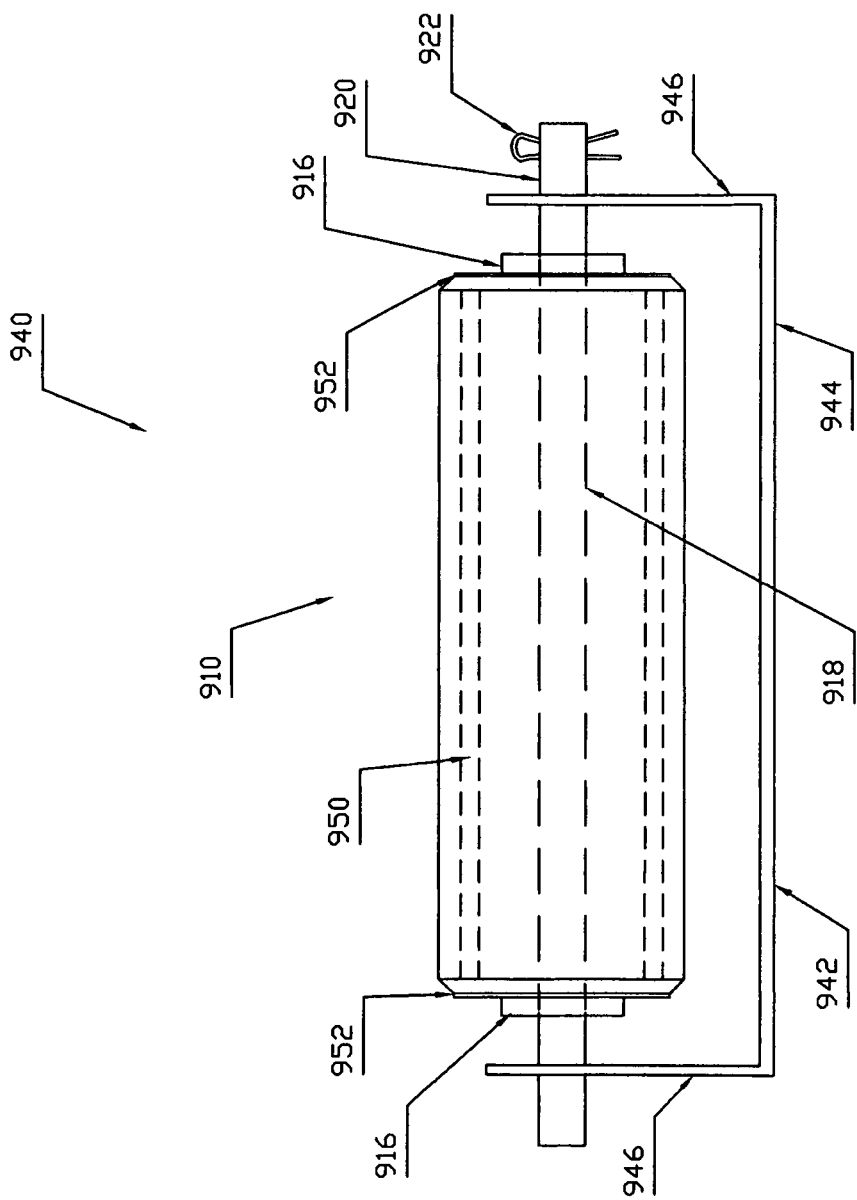
FIG. 9 depicts another embodiment of the invention put into place in an exemplary roller rack.

In its use, an exemplary roller 910 with lightening elements 950, as shown in FIG. 9, of the correct size is selected for installation into an application. The roller 910 has shoulders 916 and covers 952 for the internal lightening elements 950. Typically a group of rollers is installed as a unit called a roller tray. A roller tray consists of a multiplicity of roller assemblies 940 (roller and roller rack). The selected roller 910 is taken to the roller assembly for installation. The existing roller is first removed by removing the retaining pin 922 and sliding the axle 920 from the roller rack 942 freeing the old roller. A new roller 910 is placed between the arms 946 of the roller rack and above the base 944 of the roller rack. The axle 920 is then passed through an arm 946 of the roller rack and through the central aperture 918 of the roller 910 and finally through the second arm 946 of the roller rack 942. The retaining pin 922 is then replaced and the new roller 910 has been installed.

After installation, a new roller 910 functions as the previous conventional roller had functioned. Product is rolled over the roller 910 and, perhaps, stored on the roller 910. A user may move the product over the rollers 910 and secure the product in a suitable location. When necessary the product may be forcibly moved either by the user or through the use of tools such as pry bars.

Periodically, the rollers may be inspected visually. With translucent or transparent rollers, a quick simple visual inspection will detect any damage to the roller obviating the need for an inspector to crawl around on the rollers inspecting to discover damage to conventional rollers. However, even with an opaque roller of the invention, any internal damage to a roller can usually be readily detected by a visual inspection of the surface of the roller.

Although the present invention has been described with reference to preferred embodiments, workers skilled in the art will recognize changes may be made in form and detail without departing from the spirit and scope of the invention.

What is claimed:

1. A conveyor roller comprising:
   a) a one-piece integral body having a cylindrical shape, the entirety of the body being formed solely out of a single piece of polymeric material, said body having a length extending from a first outermost end to a second outermost end and a diameter, the first outermost end of the body defined by a first outwardly protruding portion that protrudes longitudinally from a first intermediate end to the first outermost end thereby defining a first exterior shoulder between the first outermost end and the first intermediate end, the second outermost end of the body defined by a second outwardly protruding portion that protrudes longitudinally from a second intermediate end to the second outermost end thereby defining a second exterior shoulder between the second outermost end and the second intermediate end;
   b) said body defining an aperture extending longitudinally along and through the center of said body from the first outermost end to the second outermost end, the aperture sized to rotatably receive an axle therethrough;
   c) said body also defining a plurality of internal bores that extend longitudinally parallel to the aperture extending through the center of said body, the plurality of internal bores each radially spaced evenly about the aperture extending through the center of said body, the plurality of internal bores extending through at least one of the first intermediate end and the second intermediate end of said body; and
   (d) a cover for closing at least one of the first intermediate end and the second intermediate end of said body through which the plurality of internal bores extend through;
   (e) wherein the aperture extending longitudinally through the center of the body defines at least a portion of a self-lubricating bushing that is formed by the one-piece integral body.

2. The roller of claim 1, wherein a shape of each of the internal bores is selected from a group consisting of tubular, ovular, elliptical, and spherical.

3. The roller of claim 1, wherein a polymer of the single piece of polymeric material is selected from a group consisting of polysulfone, nylon, polycarbonate, polyetherimide, polyetherketone, polyphenylene sulfide, polyvinylidene fluoride, and acetal copolymer.

4. The roller of claim 1, wherein a polymer of the single piece of polymeric material is acetal copolymer.

5. The roller of claim 1, wherein the plurality of internal bores reduces the weight of the roller by at least about 0.018 oz. compared to the weight of the roller without the plurality of internal bores.

6. The roller of claim 1, wherein the plurality of internal bores reduces the weight of the roller by at least about 0.035 oz. compared to the weight of the roller without the plurality of internal bores.

7. The roller of claim 1, wherein the roller has a compressibility strength of at least 20 psi.

8. The roller of claim 1, wherein the roller has an impact strength of at least 0.5 (foot lbs.)/inch.

9. The roller of claim 1, wherein the plurality of internal bores are filled with air.

10. A conveyor roller system comprising:
    a) at least one conveyor roller including a one-piece integral body having a cylindrical shape, the entirety of the body being formed solely out of a single piece of polymeric material, said body having a length extending from a first outermost end to a second outermost end and a diameter, the first outermost end of the body defined by a first outwardly protruding portion that protrudes longitudinally from a first intermediate end to the first outermost end thereby defining a first exterior shoulder between the first outermost end and the first intermediate end, the second outermost end of the body defined by a second outwardly protruding portion that protrudes longitudinally from a second intermediate end to the second outermost end thereby defining a second exterior shoulder between the second outermost end and the second intermediate end, said body defining an aperture extending longitudinally along and through the center of said body from the first outermost end to the second outermost end, the aperture sized to rotatably receive an axle therethrough, and said body also defining a plurality of internal bores that extend longitudinally parallel to the aperture extending through the center of said body, the plurality of internal bores each radially spaced evenly about the aperture extending through the center of said body, the plurality of internal bores extending through at least one of the first intermediate end and the second intermediate end of said body, wherein a cover closes at least one of the first intermediate end and the second intermediate end of said body through which the plurality of internal bores extend through and wherein the aperture extending longitudinally through the center of the body defines at least a portion of a self-lubricating bushing that is formed by the one-piece integral body;

b) an axel having a diameter sized to rotatably fit within the aperture extending through the center of said body of the roller, the axel further having a retention mechanism located upon axel ends; and c) an elongate "U" shaped roller rack, the roller rack sized to extend the length of the roller and having a pair of upwardly extending arms located adjacent the first and second outermost ends of the roller, each arm end having an arm aperture sized to receive a respective axel end.

11. The roller system of claim 10, wherein a polymer of the single piece of polymeric material is selected from a group consisting of polysulfone, nylon, polycarbonate, polyetherimide, polyetherketone, polyphenylene sulfide, polyvinylidene fluoride, and acetal copolymer.

12. The roller system of claim 10, wherein a polymer of the single piece of polymeric material is acetal copolymer.

\* \* \* \* \*